(12) United States Patent
Jaynes

(10) Patent No.: US 9,643,658 B2
(45) Date of Patent: May 9, 2017

(54) NARROWED TRUCK HOOD AND ASSOCIATED METHOD OF MODIFICATION

(71) Applicant: Fontaine Modification Company, Charlotte, NC (US)

(72) Inventor: Dan R. Jaynes, Mount Holly, NC (US)

(73) Assignee: Fontaine Modification Company, Charlotte, NC (US)

( * ) Notice: Subject to any disclaimer, the term of this patent is extended or adjusted under 35 U.S.C. 154(b) by 0 days.

(21) Appl. No.: 15/050,957

(22) Filed: Feb. 23, 2016

(65) Prior Publication Data

US 2016/0280278 A1 Sep. 29, 2016

Related U.S. Application Data

(60) Provisional application No. 62/137,485, filed on Mar. 24, 2015.

(51) Int. Cl.
*B62D 25/16* (2006.01)
*B62D 25/10* (2006.01)

(52) U.S. Cl.
CPC ........... *B62D 25/168* (2013.01); *B62D 25/10* (2013.01)

(58) Field of Classification Search
CPC ........ B62D 25/10; B62D 25/12; B62D 25/16; B62D 27/02; B62D 49/005; B62D 25/168
USPC .................................................. 296/193.11
See application file for complete search history.

(56) References Cited

U.S. PATENT DOCUMENTS

| | | | | |
|---|---|---|---|---|
| 3,918,540 A | * | 11/1975 | Haupt | B62D 25/12 180/69.2 |
| 6,821,605 B2 | * | 11/2004 | Fiorinelli | B29C 44/0446 296/198 |
| 7,240,753 B2 | * | 7/2007 | Ellerman | B62D 25/16 180/69.2 |
| 7,789,179 B2 | * | 9/2010 | Steiner | B29C 43/021 180/69.2 |
| 7,815,249 B2 | * | 10/2010 | Seksaria | B62D 25/105 296/193.09 |
| 2006/0249988 A1 | * | 11/2006 | Jones | B62D 25/10 296/193.11 |
| 2009/0066117 A1 | * | 3/2009 | Weeks | B62D 25/10 296/193.11 |
| 2010/0253034 A1 | * | 10/2010 | Crismon | B62D 25/182 280/154 |

* cited by examiner

*Primary Examiner* — Gregory Blankenship
(74) *Attorney, Agent, or Firm* — Andrus Intellectual Property Law, LLP

(57) ABSTRACT

Modified vehicle hoods and methods of modifying truck hoods are provided herein. The modified vehicle hoods are narrowed in width compared to the original truck hood. The modified width of the modified hood may be less than the horizontal width between the forward support posts of a hauler rack, allowing the modified hood to be opened without contacting the support posts. Methods of modifying truck hoods include marking each of the pair of fenders of the vehicle with cut lines, cutting the pair of fenders to remove excess hood material, and then attaching a pair of fender panels to the pair of cut vehicle fenders.

15 Claims, 10 Drawing Sheets

NARROWED TRUCK HOOD AND ASSOCIATED METHOD OF MODIFICATION

RELATED APPLICATIONS

This application is based on and claims the benefit of U.S. Provisional Patent Application No. 62/137,485, filed on Mar. 24, 2015, the contents of which are hereby incorporated by reference in their entirety.

FIELD OF THE INVENTION

The present invention relates generally to the field of automotive manufacturing and modification and, in particular, to a modified vehicle hood, a fender panel for use in modifying a vehicle hood, and an associated method of modifying a vehicle hood.

BACKGROUND OF THE INVENTION

Automotive manufacturers typically mass produce vehicles in standard configurations, as it is not efficient or economical to produce configurations for which there is limited demand. For example, it may be worth establishing an assembly line for a configuration with a demand of 1,500 units per year, but not for a configuration with a demand of 800 units per year. However, it may be desirable for many automotive fleets to have special features. For example, it may be desirable for garbage trucks to have right-side steering wheels and/or standing driving cabs. Likewise, it may be desirable for auto-haulers to have narrower hoods so that standard auto hauler racks may be mounted on the truck. In such cases, automotive modification companies profitably fill the void, modifying vehicles to meet the requirements of specific applications.

An auto hauler rack, an example of which is indicated in general at 10 in FIG. 1, is typically mounted onto the chassis of a vehicle, such as truck 12. The rack features a number of auto transport platforms, such as 14 and 16, that support automobiles so that they may be transported on the highway. The upper auto transport platforms are supported by a number of generally vertical support posts. Forward support posts 18*a* and 18*b* feature top end portions attached to the auto transport platform or head rack 14 and bottom end portions attached to the outer extremes of the front bumper 19 of the truck 12.

Auto hauler rack manufacturers typically manufacture their racks with a standard horizontal width between the rack forward supports posts, indicated by arrows 22 in FIG. 1. Furthermore, most truck manufacturers produce trucks where the hood of the truck articulates, tilts or pivots forward to provide access to the engine compartment. The hood typically includes the engine cover 24 and fenders 26*a* and 26*b*. This creates a fitment issue if the combined width of the engine cover 24 and fenders 26*a* and 26*b* exceeds the horizontal width 22 between the rack forward support posts. More specifically, the hood is unable to flip forward due to the outer portions of the fenders 26*a* and 26*b* contacting the forward support posts. This issue limits the options as to what model trucks may be used with what model racks.

Other types of equipment that feature forward support posts also may have a horizontal width between the forward support posts that prevents use of some truck models.

A need therefore exists for a method and components that permit truck hoods or fenders to be modified by being narrowed for use in specialized applications.

DETAILED DESCRIPTION OF EMBODIMENTS

While the modified vehicle hood, fender panels, and methods of modifying a vehicle hood of present technology are described below in terms of a truck having a tilting, articulating or pivoting hood composed of the two front fenders and an engine cover formed or connected together as a single unit, the present technology may also be used to modify vehicles where the front fenders, or other body parts, are separate from the vehicle engine cover or hood. For example, the front fenders may need to be narrowed to permit equipment to be installed on the vehicle or for the vehicle to be used in a specialized application.

Figure 1:
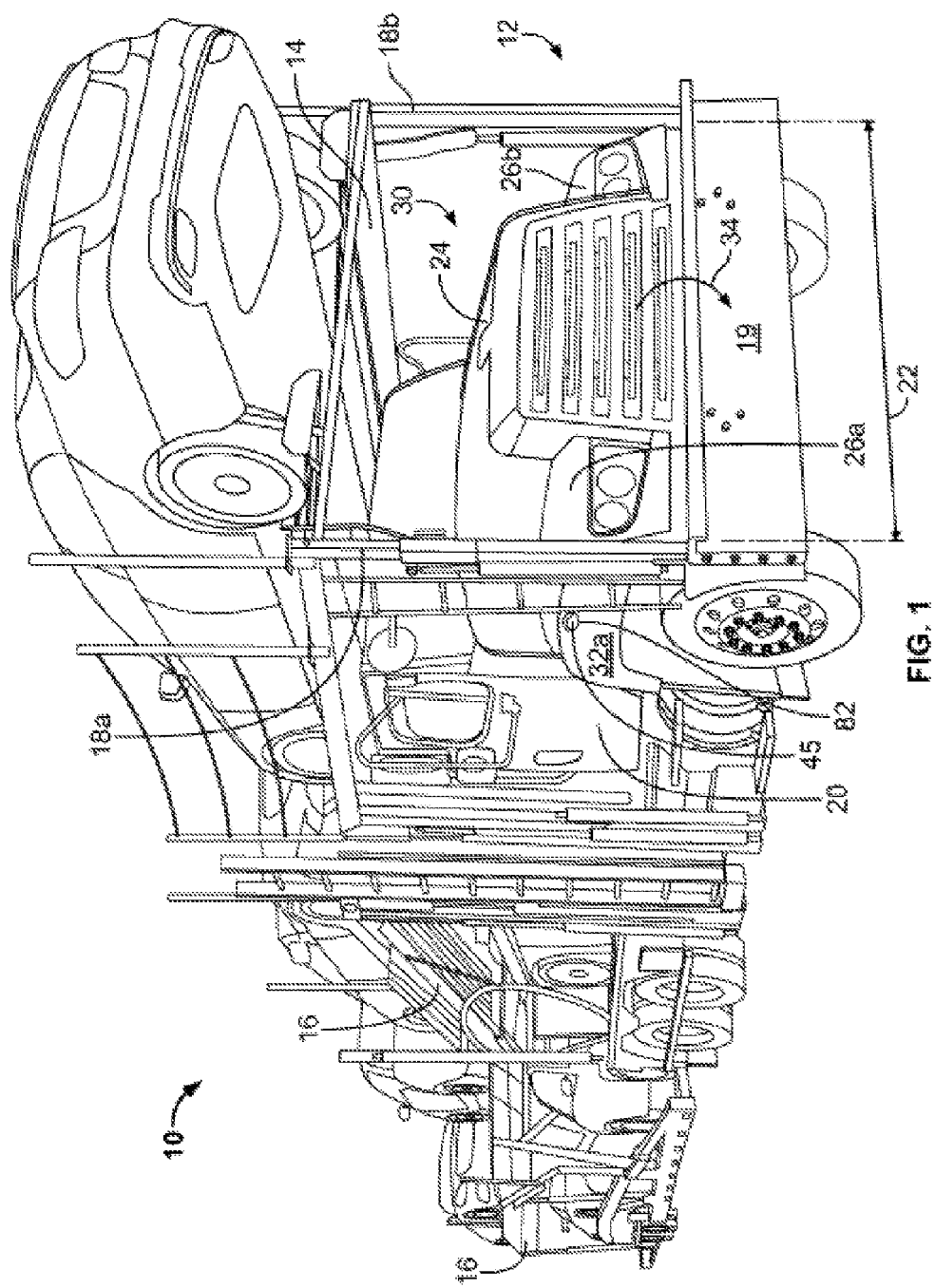
FIG. 1 is a front perspective view of a truck configured as an auto hauler with a modified hood in accordance with one embodiment of the present technology.
Figure 2:
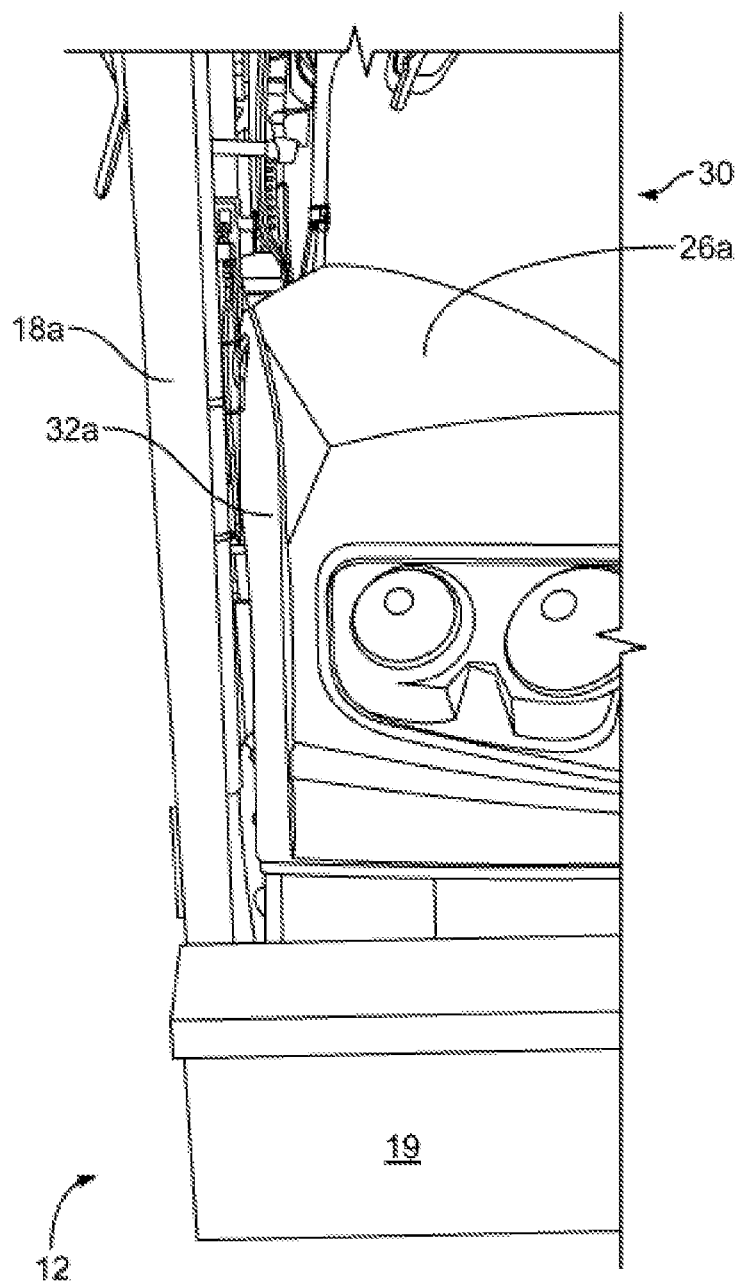
FIG. 2 is an enlarged front perspective view of a fender of the truck of FIG. 1.
Figure 7A:
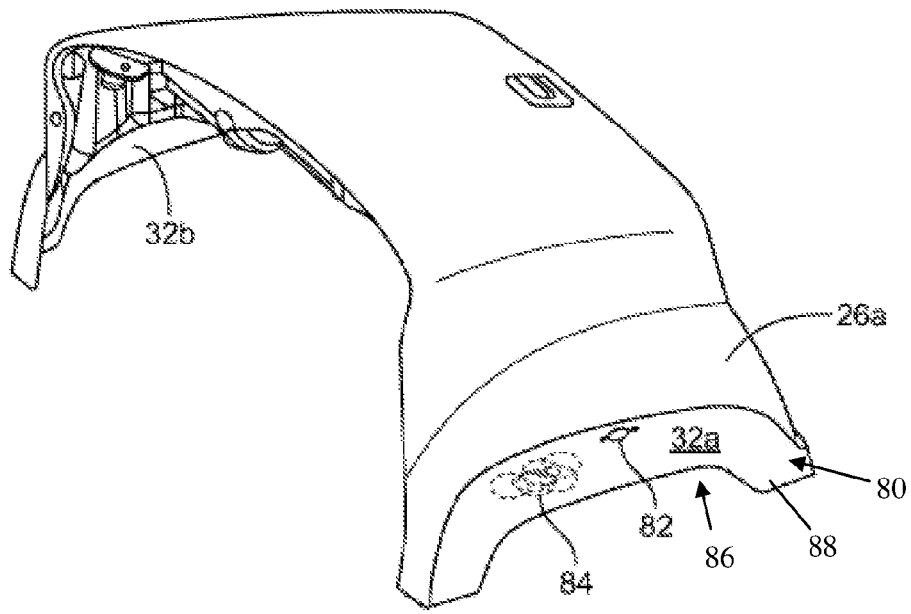
FIGS. 7A and 7B are rear and front perspective views, respectively, of the modified hood of the truck of FIGS. 1 and 2.

With reference to FIGS. 1, 2, and 7A, a vehicle such as truck 12 can have a modified hood 30, that has been modified in accordance with one embodiment of the present technology. More specifically, the modified hood 30 has a width that is narrowed as compared to the original width of the hood. As shown, each of fenders 26*a* and 26*b* has a cutaway portion 56 (FIG. 5), where the fender has been cut and excess hood material has been removed. The cutaway portions of the fenders 26*a* and 26*b* of the modified hood 30 has a fender panel 32*a* and 32*b*, respectively, attached thereto. As a result, the width of the modified hood 30 has been reduced. In some examples, the amount of reduction in the width of the modified hood 30 may be up to about three inches, or any other amount of reduction that permits the hood to fit between the forward support posts 18*a* and 18*b* (FIG. 1) when it is pivoted forward (in the direction of arrow 34 of FIG. 1) for accessing the truck engine compartment. As a result, the manufacturer of the auto hauler rack may use a standard rack 10 rather than manufacturing one specifically designed for use on the specific model of truck 12.

Figure 3A:
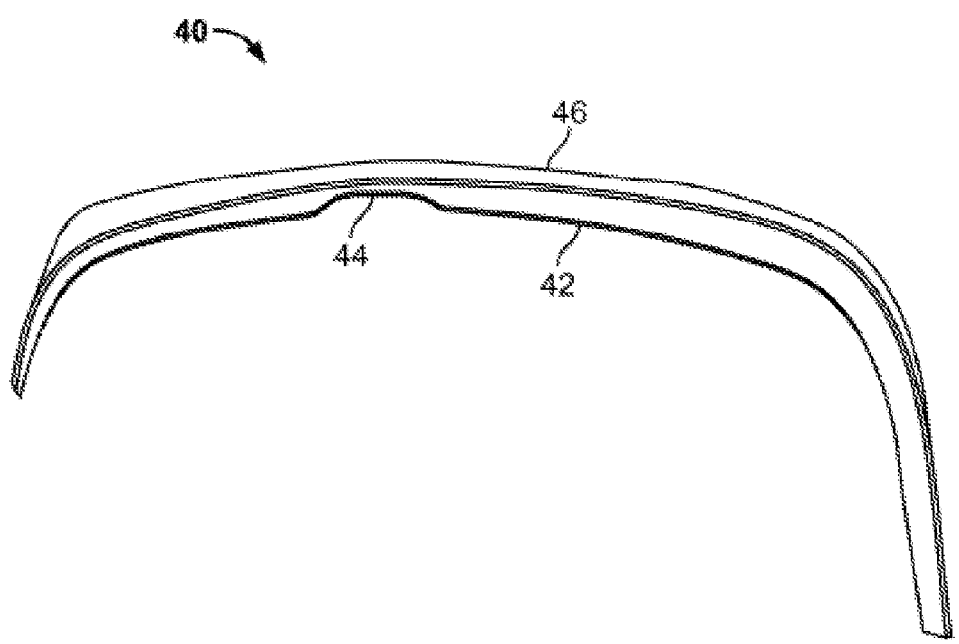
FIGS. 3A and 3B are front and rear views of a cutting template used in one embodiment of the present technology.
Figure 3B:
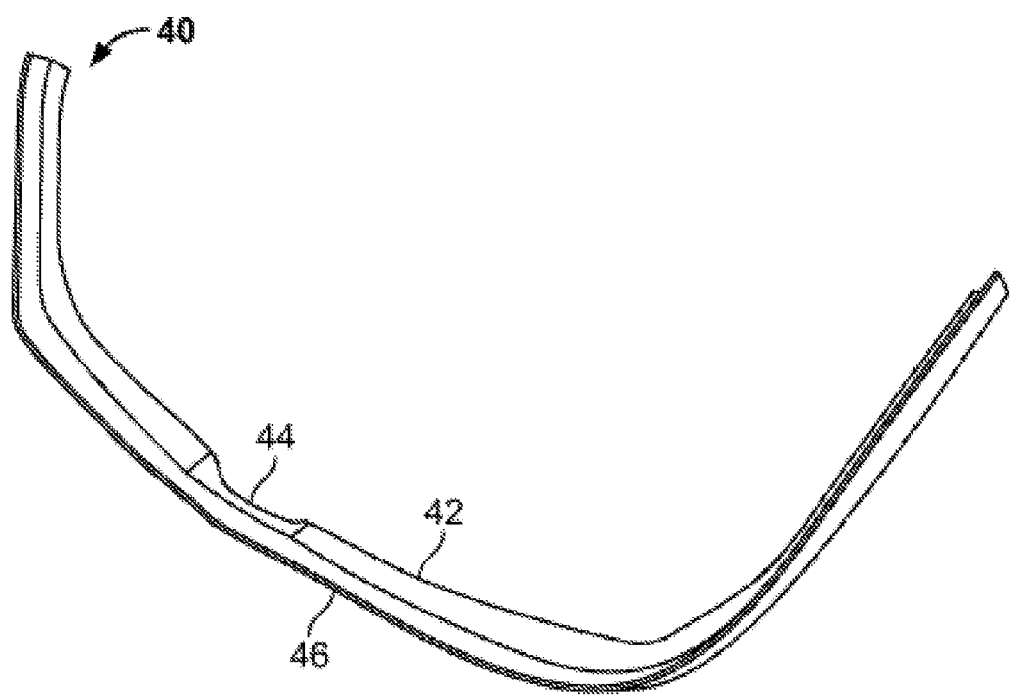

The fenders of a vehicle, such as truck 12, are typically manufactured of fiberglass, or some other type of material that may be cut. With reference to FIGS. 3A and 3B, in accordance with one embodiment of the present technology, a cutting template 40 may be used as a guide for cutting the fenders. The template 40 may be made of, for example, fiberglass or plastic mounted on a steel rod or sheet metal, and is formed lengthwise into a generally arcuate shape with a channel-shaped cross section that follows the contours of the fenders. The template 40 may have an upper edge 46 and a lower edge 42. The lower edge 42 of the template 40 may have a recess 44, which may be configured to accommodate a turn signal light 45 (FIG. 4) of the vehicle.

Figure 9:
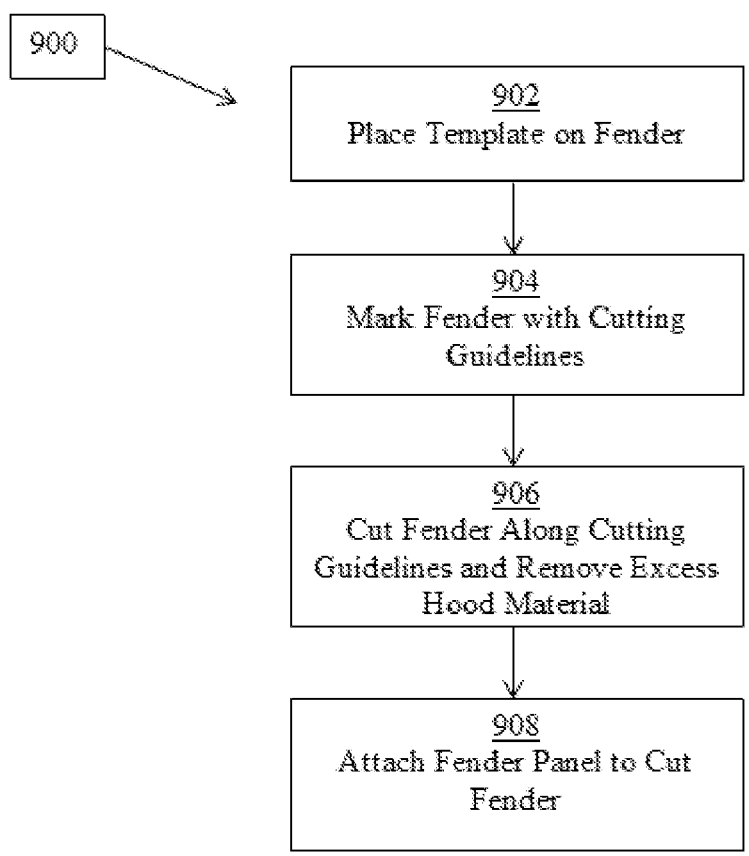
FIG. 9 is a flow chart for one method of modifying a vehicle hood in accordance with the present technology.

FIG. 9 is a flow chart for one method 900 of modifying a vehicle hood in accordance with the present technology. Although the method is generally described with respect to one of the pair of fenders, it should be understood that the same steps can be repeated, or performed in parallel, for each fender.

At step 902, a template, such as template 40 of FIGS. 3A and 3B, can be placed against one of the fenders 26a or 26b. For example, with reference to FIG. 4, the template 40 may be placed against the truck front fender 26b at a location between the engine cover 24 of the hood and the lip 52 of the wheel well, so that the template 40 generally surrounds the wheel well lip. The recess 44 of the template 40 may receive the turn signal light 45 of the vehicle (FIG. 4) and may help properly locate or position the template 40 on the fender. Accordingly, step 902 can include positioning the recess 44 of the template 40 over the turn signal light 45 of the vehicle.

At step 904, the fender may be marked with cutting guidelines. In practice, a user may hold the template 40 in place, by hand or by other means, and mark the fender along the upper edge 46 of the template 40, using a marker pen or some other marking device, to provide the fender with cutting guidelines as indicated in phantom at 54 in FIG. 4.

At step 906, the fender may be cut along the cutting guidelines and the excess hood material can be removed. Any suitable tool can be used for cutting, including, for example, an electric cutting wheel, saw or other cutting tool. The result is a cut fender, as shown with respect to fender 26a in FIG. 5.

Figure 5:
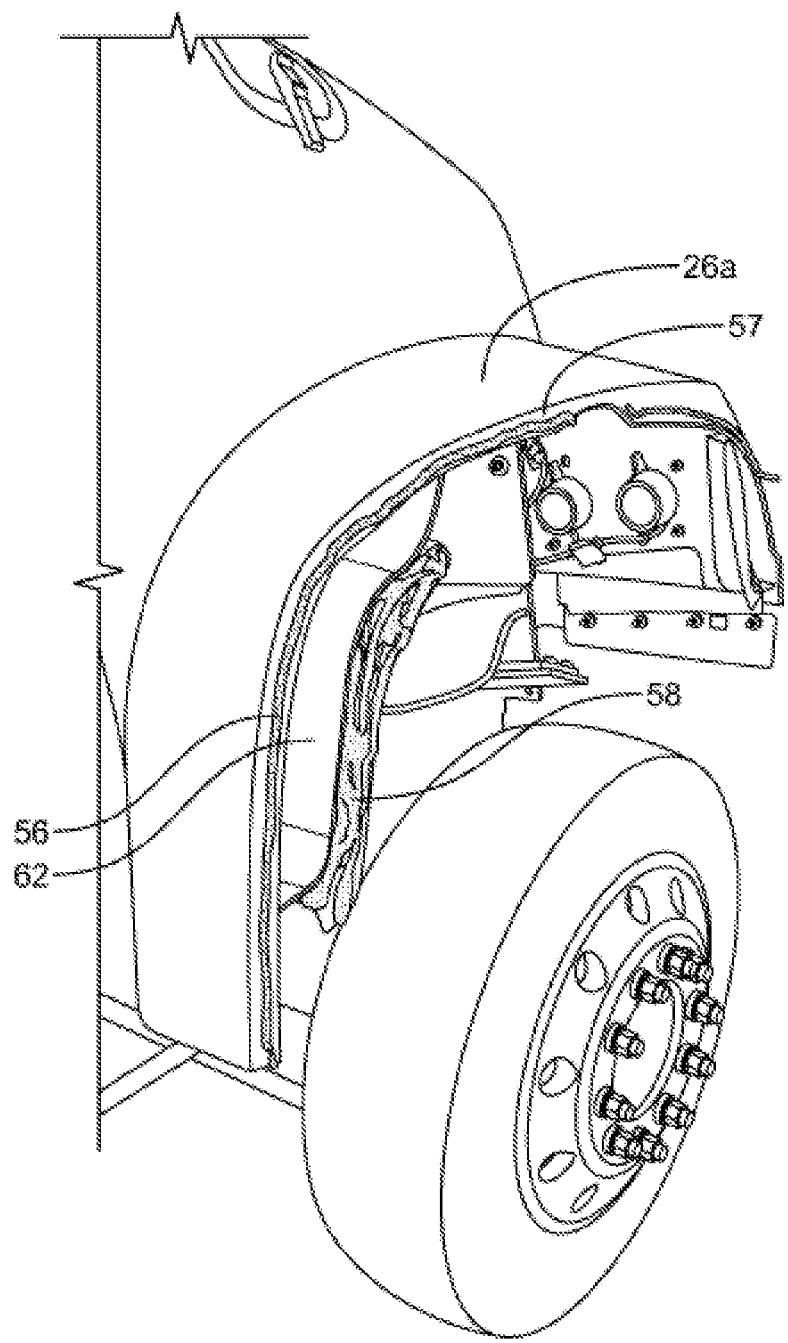
FIG. 5 is an enlarged rear perspective view of a front fender of the truck of FIG. 4 after being cut in accordance with one embodiment of the present technology.
Figure 6:
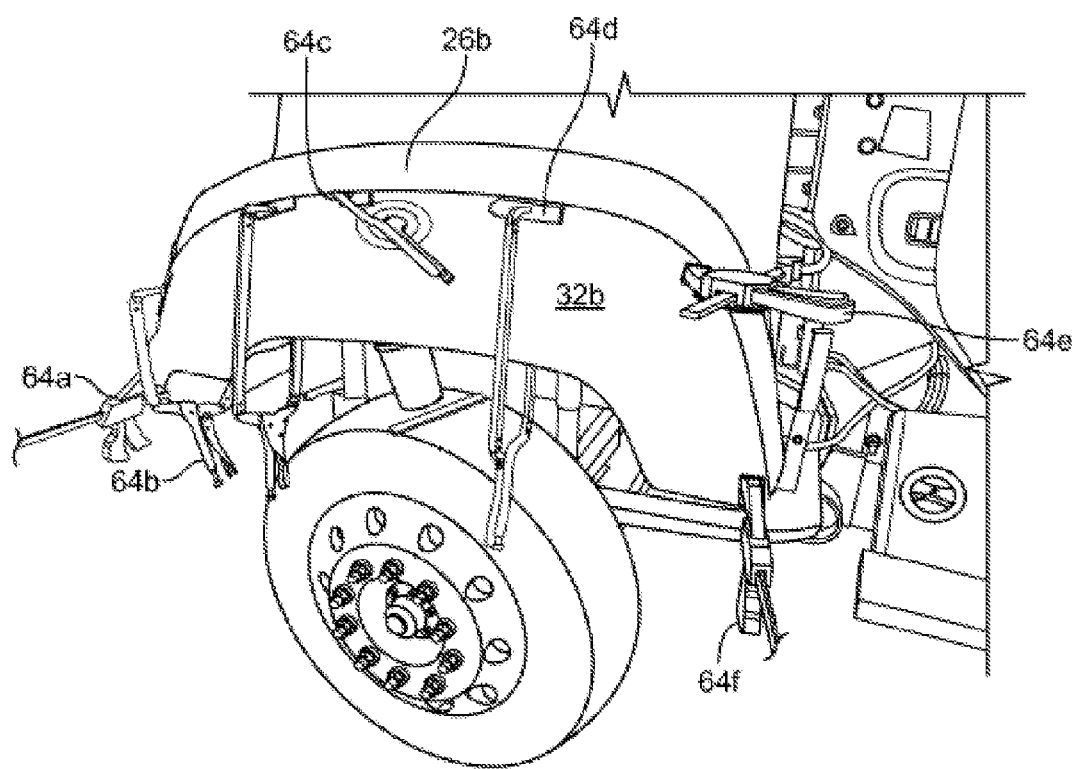
FIG. 6 is side perspective view of the fender of FIG. 5 with a fender panel clamped thereto in accordance with one embodiment of the present technology.

At step 908, a fender panel, such as fender panel 32a or 32b, can be attached to the cut fender. For example, as illustrated in FIG. 5, a structural adhesive may be applied to the cut fender 26a. More specifically, the adhesive may be applied to the outermost cut fender surface 56 along the perimeter 57 of the cut fender, and at outermost cut inner structure surface 58 of the inner structure 62. As a non-limiting example, PLEXUS™ MA422 or MA320, available from ITW Plexus, may be used as the structural adhesive. Next, a fender panel, such as fender panel 32b may be attached to the outermost cut fender surface 56, as well as to the outermost cut inner structure surface 58. For example, the fender panel may be positioned on the cut fender so that the adhesive is sandwiched between portions of the panel and the cut fender, as shown in FIG. 6. The fender panel 32b may be secured in position using hand clamps such as 64a-64f. A fender panel (32a in FIGS. 7A and 7B) is similarly clamped to cut fender 26a and adhesive 56 and 58 (FIG. 5).

Figure 7B:
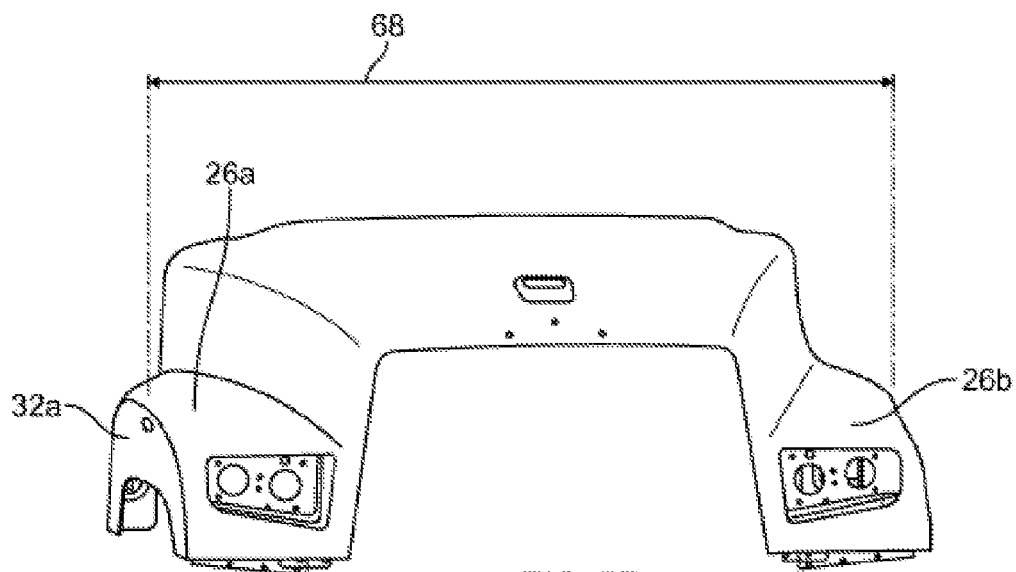

After a sufficient amount of drying time (dependent on the type of adhesive used) the hand clamps may be removed from the truck cut fenders and fender panels. With reference to FIGS. 7A and 7B, this may result in the fender panels 32a and 32b being securely fastened to the fenders 26a and 26b so that a reduced hood width, illustrated by arrows 68 of FIG. 7B, is provided.

It should be noted that alternative methods of attaching the fender panels to the cut hood may be used instead of adhesive. These may include fasteners or any other suitable attachment system, device or method known in the art.

As shown in FIGS. 1 and 7B, the modified width 68 of the modified hood 30 is less than the horizontal width between the rack forward supports posts 22. Accordingly, the modified hood 30 of the truck 12 may be articulated and flipped forward without contacting the forward support posts 18a and 18b of the hauler rack 14.

Figure 4:
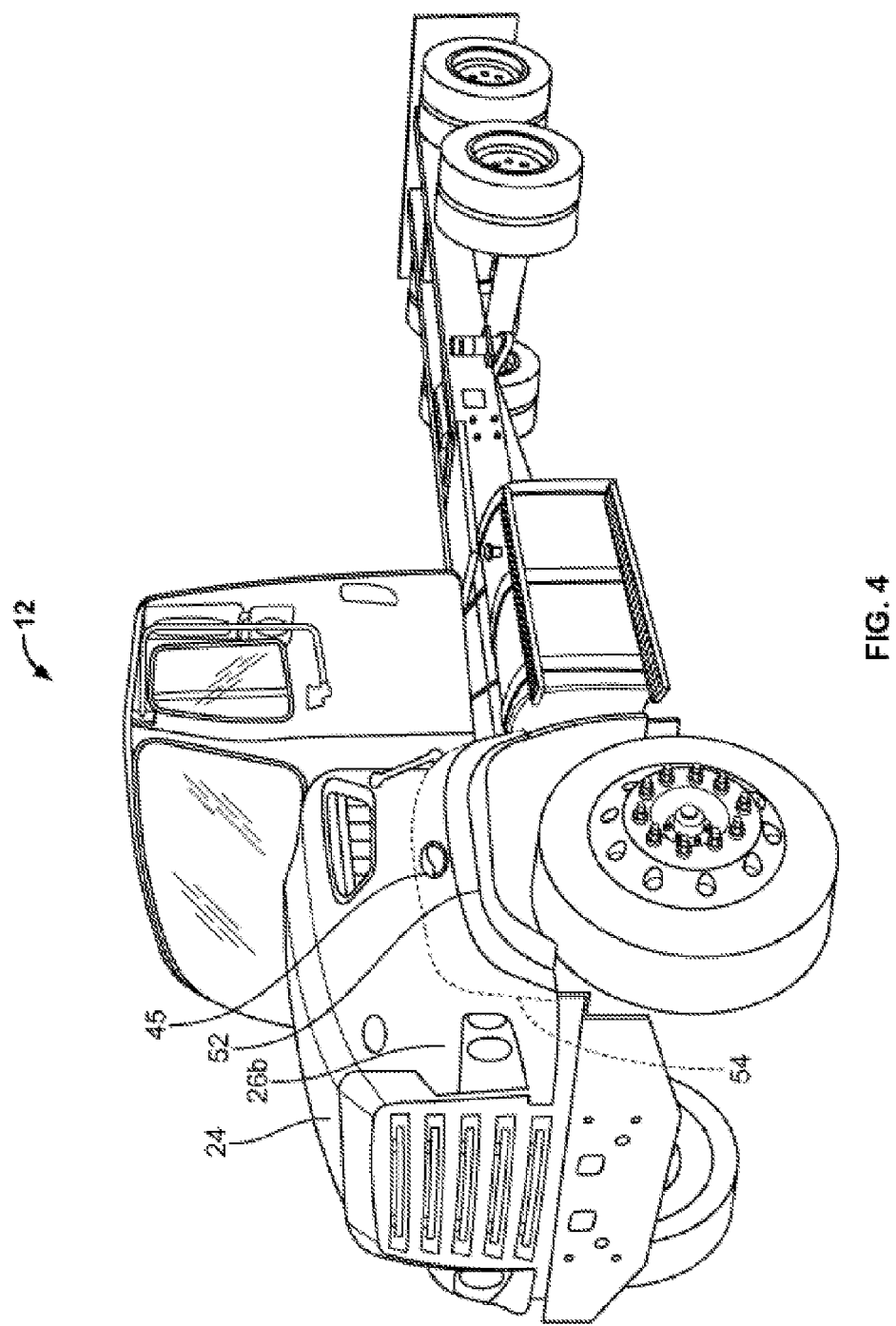
FIG. 4 is a side perspective view of a truck prior to modification.
Figure 8:
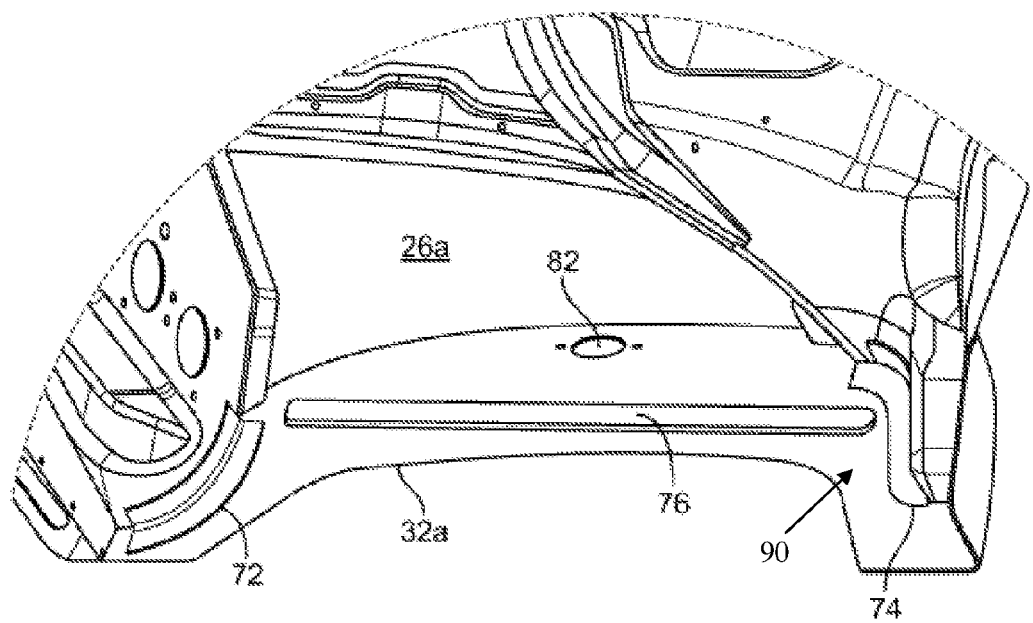
FIG. 8 is a partial inner perspective view of one of the fenders of the hood of FIGS. 7A and 7B.

With reference to FIGS. 7A-8, each fender panel 32a and 32b has a body 80, which may be substantially flat and is configured to cover a cutaway portion of the vehicle fender. The body 80 may have an arcuate lower edge 86 that defines a wheel well. The body 80 of each fender panel 32a and 32b may also have an outer side 88 and an inner side 90, the inner side 90 being adapted to be attached to the cutaway portion of a fender 26a or 26b. Each fender panel 32a and 32b may be constructed from a rigid or semi-rigid material such as fiberglass. The fender panels 32a and 32b could alternatively be constructed from any rigid or semi-rigid material, such as sheet metal or plastic. As illustrated in FIG. 8, the inner side 90 of each fender panel 32a and 32b may be provided with a molded strengthening rib 76. Each fender panel 32a and 32b may also include a turn signal light hole 82 configured to receive and retain a signal light of a vehicle, such as turn signal light 45 (FIG. 4).

As illustrated in FIG. 8 for fender 26a and fender panel 32a, a front support brace 72 and rear support brace 74 are optionally provided. Each support brace may include a first half and a second half that are joined by adjacent edges to form either an L-shaped or V-shaped cross-section. Adhesive may be applied to each half of each support brace with one half of each support brace secured by the adhesive to an inner surface of the cutaway portion of the fender and the other half secured by the adhesive to the inner surface of the fender panel.

The outer side 88 of each of the fender panels 32a and 32b may have a texture 84, as shown in FIG. 7A, that may provide a pleasing aesthetic appearance and/or improve the surface strength of the panel. In addition, the at least the outer side 88 of each of the fender panels 32a and 32b may have a protective coating to protect the fender panels from rock chips from the truck front wheels and scuffs or scrapes from inadvertent contact with forward support posts 18a and 18b of the head rack. As a non-limiting example, the protective coating may be a polyurethane or other plastic coating that is sprayed on, painted on, or otherwise applied, such as the truck bed liner materials available from Rhino Linings Corporation or Line-X, LLC.

While the preferred embodiments of the invention have been shown and described, it will be apparent to those skilled in the art that changes and modifications may be made therein without departing from the scope of the invention.

What is claimed is:

1. A modified vehicle hood comprising a width that is narrowed as compared to an original width of the hood, the hood having a pair of fenders, and each fender having a cutaway portion and a fender panel attached to the cutaway portion;
   wherein each fender panel has a body, an inner side attached to the cutaway portion of the fender, and an outer side.

2. The modified vehicle hood of claim 1, wherein each fender panel is constructed of a rigid or semi-rigid material.

3. The modified vehicle hood of claim 1, wherein the inner side of each fender panel includes a strengthening rib.

4. The modified vehicle hood of claim 1, wherein at least the outer side of each fender panel has a protective coating.

5. The modified vehicle hood of claim 4, wherein the protective coating is polyurethane.

6. The modified vehicle hood of claim 1, wherein the outer side of each fender panel has a texture.

7. The modified vehicle hood of claim 1, wherein each fender panel further comprises a signal light hole configured to receive and retain a signal light of a vehicle.

8. The modified vehicle hood of claim 1, wherein each fender panel further comprises a support brace having a first half and a second half that are joined by adjacent edges.

9. A fender panel to be attached to a cutaway portion of a fender on a modified vehicle hood, the fender panel comprising:
   a flat body having an arcuate lower edge that defines a wheel well;
   a vertically oriented inner side configured to be attached to the cutaway portion of the fender; and
   a vertically oriented outer side;
   wherein the vertically oriented inner and outer sides of the fender panel define immediately opposite sides of the flat body.

10. The fender panel of claim 9, wherein the fender panel is constructed from a rigid or semi-rigid material.

11. A method of modifying a vehicle hood having a pair of fenders, the method comprising the steps of:
   (a) providing at least one fender in the pair of fenders with cutting guidelines;
   (b) cutting the at least one fender along the cutting guidelines to remove excess hood material and to provide a cut fender having an outermost cut fender surface; and
   (c) attaching a fender panel to the outermost cut fender surface.

12. The method of claim 11, further comprising placing a template on the at least one fender, wherein the template has an upper edge and the cutting guidelines are marked along the upper edge of the template.

13. The method of claim 12, wherein the step of placing the template includes placing the template at a location between an engine cover and a lip of a wheel well.

14. The method of claim 12, wherein the template includes a recess configured to receive a turn signal light, and the step of placing the template includes positioning the recess of the template over the turn signal light.

15. The method of claim 11, wherein the fender panel is attached to the outermost cut fender surface by adhesive.

* * * * *